US008859936B2

(12) United States Patent
Sato et al.

(10) Patent No.: US 8,859,936 B2
(45) Date of Patent: Oct. 14, 2014

(54) METHOD OF CONTROLLING WELDING

(75) Inventors: Kimiya Sato, Hyogo (JP); Yasushi Mukai, Osaka (JP); Atsuhiro Kawamoto, Hyogo (JP); Akira Nakagawa, Osaka (JP); Masaru Kowa, Osaka (JP)

(73) Assignee: Panasonic Corporation (JP)

( * ) Notice: Subject to any disclaimer, the term of this patent is extended or adjusted under 35 U.S.C. 154(b) by 293 days.

(21) Appl. No.: 13/121,433

(22) PCT Filed: Feb. 18, 2010

(86) PCT No.: PCT/JP2010/001027
§ 371 (c)(1),
(2), (4) Date: Mar. 29, 2011

(87) PCT Pub. No.: WO2010/109759
PCT Pub. Date: Sep. 30, 2010

(65) Prior Publication Data
US 2012/0000895 A1  Jan. 5, 2012

(30) Foreign Application Priority Data
Mar. 23, 2009  (JP) .................................. 2009-069476

(51) Int. Cl.
*B23K 9/10*  (2006.01)
*B23K 33/00*  (2006.01)
(Continued)

(52) U.S. Cl.
CPC ................ *B23K 9/173* (2013.01); *B23K 9/091* (2013.01); *B23K 9/095* (2013.01); *B23K 9/0735* (2013.01)

USPC .................................. 219/130.31; 219/137 R

(58) Field of Classification Search
USPC ...... 219/130.01–130.51, 136, 137 R, 137 PS, 219/137 WM, 137.2
See application file for complete search history.

(56) References Cited

U.S. PATENT DOCUMENTS 4,427,874 A * 1/1984 Tabata et al. ............. 219/130.51
5,432,317 A * 7/1995 Church ....................  219/137 PS
(Continued)

FOREIGN PATENT DOCUMENTS

CN          1583341 A      2/2005
CN          1621189 A      6/2005
(Continued)

OTHER PUBLICATIONS

International Search report to PCT/JP2010/001027, Jun. 1, 2010, Panasonic Corporation.

*Primary Examiner* — Sang Y Paik
(74) *Attorney, Agent, or Firm* — RatnerPrestia

(57) ABSTRACT

A welding control method for a welding device having an output characteristic with a predetermined gradient showing a relation between a welding output voltage and a welding output current. By setting a set target welding voltage that is higher than the set initial welding voltage according to a difference between the set initial welding voltage and the welding output voltage, the welding output voltage is controlled to be the set target welding voltage. Thus, a proper arc length can be achieved early by correcting the change of the arc length due to, for example, motion of the hands of a welding operator.

18 Claims, 3 Drawing Sheets

(51) Int. Cl.
   *B23K 9/173* (2006.01)
   *B23K 9/09* (2006.01)
   *B23K 9/095* (2006.01)
   *B23K 9/073* (2006.01)

(56) References Cited

U.S. PATENT DOCUMENTS

| 6,335,511 | B1* | 1/2002 | Rothermel | 219/130.51 |
| 6,376,802 | B1* | 4/2002 | Tong et al. | 219/137 PS |
| 6,566,625 | B1* | 5/2003 | Hughes | 219/121.46 |
| 8,383,986 | B2* | 2/2013 | Uezono et al. | 219/130.21 |
| 2006/0060574 | A1* | 3/2006 | Blankenship et al. | 219/130.21 |

FOREIGN PATENT DOCUMENTS

| JP | 55-077982 A | 6/1980 |
| JP | 59-073178 A | 4/1984 |
| JP | 60-127078 A | 7/1985 |
| JP | 61-038782 A | 2/1986 |
| JP | 09-277044 A | 10/1997 |
| JP | 2004-237342 A | 8/2004 |
| JP | 2005-066615 A | 3/2005 |

* cited by examiner

ΔIB: Change amount of base current
ΔIP: Change amount of peak current

METHOD OF CONTROLLING WELDING

This application is a U.S. National Phase Application of PCT International Application No. PCT/JP2010/001027.

TECHNICAL FIELD

The present invention relates to a welding control method for arc welding in which an arc is generated between a welding wire as a consumable electrode and a base material as a material to be welded, thereby carrying out welding.

BACKGROUND ART

In recent years, in the welding industry, the need for improving productivity of welding work and improving product quality has been increased. In particular, automobile and motorcycle industries, the need for improving production efficiency by producing a larger number of materials to be welded (hereinafter, referred to as a "workpiece") for a short time than before, reducing production cost per workpiece, and reducing occurrence of defective pieces such as those with lack of weld beads or those with holes so as to improve the yield has been increased. In order to meet such needs, it is extremely important to stabilize the arc length during welding.

However, due to displacement of workpieces or inaccuracy of workpieces, a gap occurs between the workpieces, and thus the length of wire extension is changed. As a result, the arc length is changed. Furthermore, the arc length is changed also due to motion of the hands of a welding operator. Since the arc length is changed due to such external influences, the welding quality cannot be improved.

In consumable electrode type arc welding, a plurality of output characteristics of a welding power-supply device to respond to the arc length change generated by various external influences including the above-mentioned examples have been conventionally known.

One of such characteristics is, as shown by a solid line in FIG. 5, a right downward sloping characteristic in which as an output current is increased, an output voltage is reduced. According to this characteristic, the self-regulation of the arc length works, so that the arc length becomes constant. The reducing gradient is generally about 1 V to 3 V/100 A. However, it may be 0 V/100 A or about 10 V/100 A depending on the welding method, welding wire, and the like.

In FIG. 5, for example, when the arc length is shortened by an external influence from state (P1) in which welding is carried out under the welding conditions of output current A1 and output voltage V1, the output current is increased from A1 to A2 and the output voltage is reduced from V1 to V2, and the state is shifted from P1 to P2 on the output characteristic. However, when the output current is increased, a melting amount of the wire is increased and the arc length is gradually increased to return to P1. This is called a self-regulation.

In detail, when a wire is fed at a constant speed by using a welding power-supply device having a constant voltage characteristic, and metal inert gas (MIG) welding or metal active gas (MAG) welding is carried out, a phenomenon in which the arc length automatically becomes a predetermined value occurs. This is called a self-regulation. However, in response to changes of the arc length due to various external influences, the self-regulation takes a long time to return the arc length to the original arc length.

Furthermore, in pulse arc welding, according to a conventional output control method, when a change of the arc length due to an external influence is large, at least one of a base current or a peak current is increased or reduced with a difference between a welding output voltage and a set welding voltage (see, for example, patent document 1). In this control method, when an arc becomes unstable, that is, when the welding output voltage is largely changed due to an external influence, the change of pulse frequency can be suppressed by increasing or reducing a base current or a peak current for correcting large change amount. Thus, the arc length can be stabilized and occurrence of irregular short-circuit can be suppressed so as to suppress spatters. However, this output control method also takes a long time to return the arc length to the original arc length.

[Patent Document] Japanese Patent Application Unexamined Publication No. 2004-237342

SUMMARY OF THE INVENTION

The present invention provides a welding control method for a welding device having an output characteristic with a predetermined gradient showing a relation between a welding output voltage and a welding output current. The method includes setting a set target welding voltage that is higher than a set initial welding voltage or setting the set target welding voltage that is lower than the set initial welding voltage according to a difference between the set initial welding voltage and the welding output voltage, thereby controlling the welding output voltage to become the set target welding voltage.

The present invention provides a welding control method for a welding device having an output characteristic with a predetermined gradient showing a relation between a welding output voltage and a welding output current. The method includes setting a set target welding voltage that is higher than a set initial welding voltage or setting the set target welding voltage that is lower than the set initial welding voltage according to a difference between a pulse welding output voltage of a pulse preceding to a pulse at a certain time point during welding and a plurality of pulse welding output voltages output before the preceding pulse, thereby controlling the welding output voltage to become the set target welding voltage.

Furthermore, the present invention provides a welding control method for a welding device having an output characteristic with a predetermined gradient showing a relation between a welding output voltage and a welding output current. The method includes setting a set target welding current that is higher than a set initial welding current or setting the set target welding current that is lower than the set initial welding current according to a difference between the set initial welding current and the welding output current, thereby controlling the welding output current to become the set target welding current.

Such a configuration allows a stable droplet transfer by early stabilizing an arc length with respect to change of the arc length generated due to external influences. Thus, since it is possible to suppress occurrence of irregular short circuit and to suppress spatters, productivity and product quality can be improved.

DETAILED DESCRIPTION OF THE PREFERRED EMBODIMENT

Exemplary Embodiment

Figure 1:
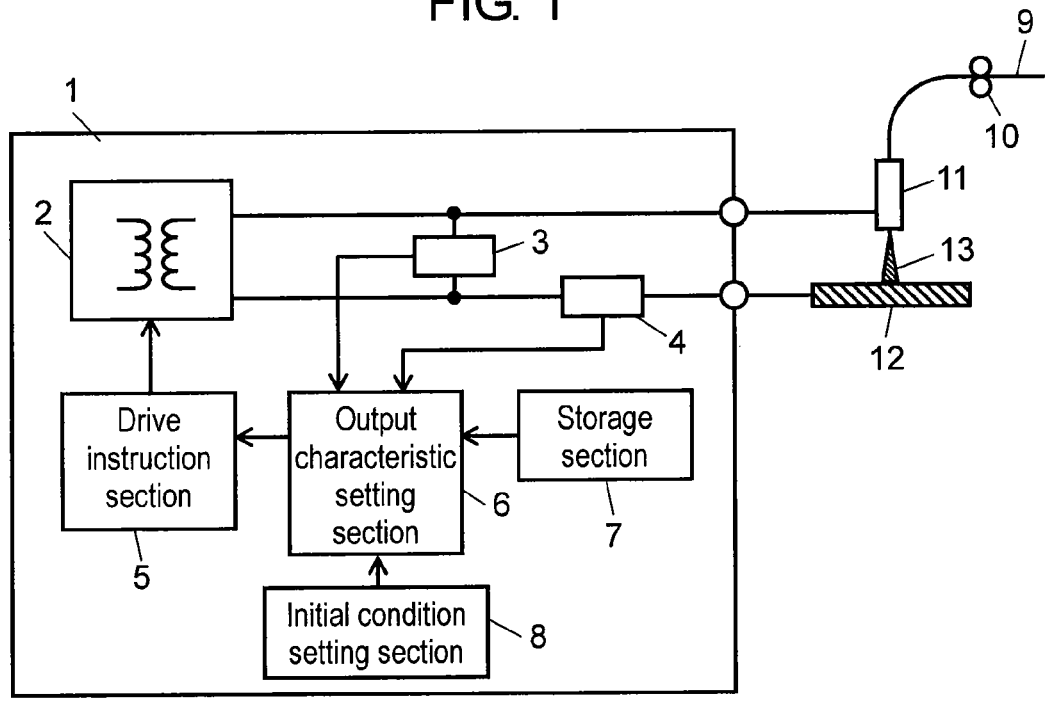
FIG. 1 is a schematic configuration diagram showing a welding device to which a welding control method is applied in accordance with one exemplary embodiment of the present invention.

Hereinafter, a welding control method of the present invention is described based on an exemplary embodiment with reference to drawings. However, the present invention is not intended to be limited to this exemplary embodiment. FIG. 1 is a schematic configuration diagram showing an example of a welding device to which a welding control method is applied in accordance with one exemplary embodiment of the present invention.

Welding device 1 shown in FIG. 1 includes storage section 7 that stores output characteristics as numerical formulae; initial condition setting section 8 for setting initial welding conditions, and the like; output characteristic setting section 6 for setting an output characteristic based on output characteristics stored in storage section 7, an output from welding voltage detection section 3, an output from welding current detection section 4, and an output from initial condition setting section 8; and drive instruction section 5 for driving output control section 2 based on an output from output characteristic setting section 6.

In welding device 1 having such a configuration, output control section 2 receives a signal from drive instruction section 5 and carries out output control such as inverter control, thyristor control, or the like, thereby supplying voltage and current between torch 11 and base material 12, and generating arc 13 between welding wire 9, which is fed from wire feed device 10 to torch 11, and base material 12. Thus, base material 12 is welded.

Figure 2:
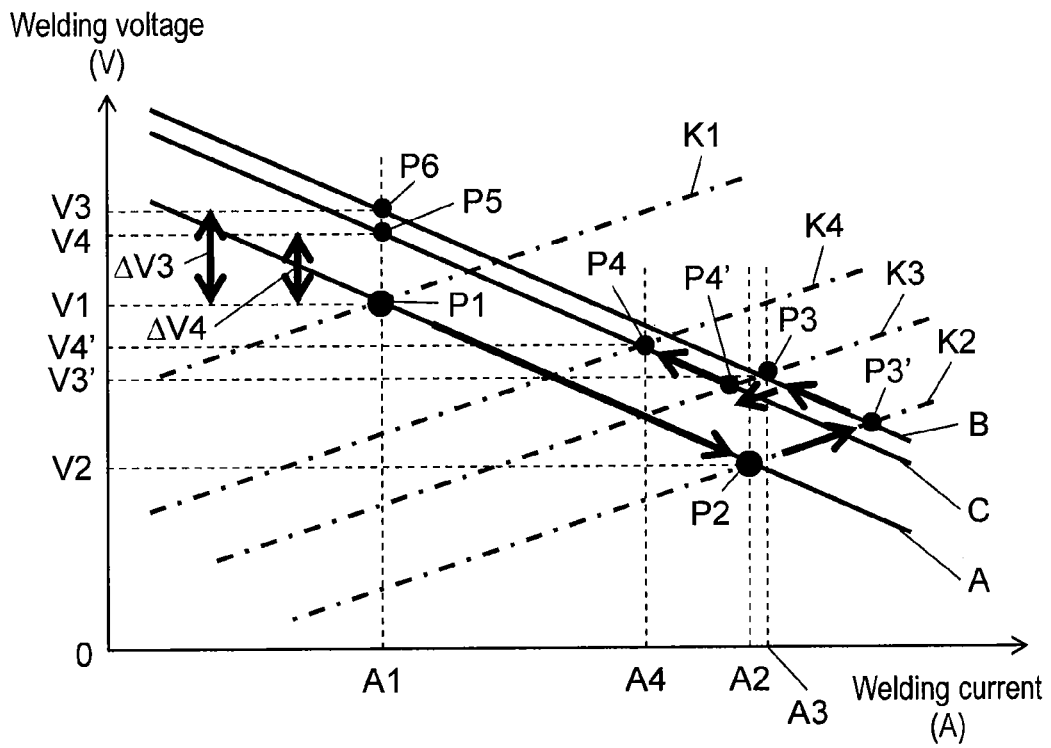
FIG. 2 is a graph showing output characteristics of a welding current and a welding voltage in accordance with one exemplary embodiment of the present invention.
Figure 3:
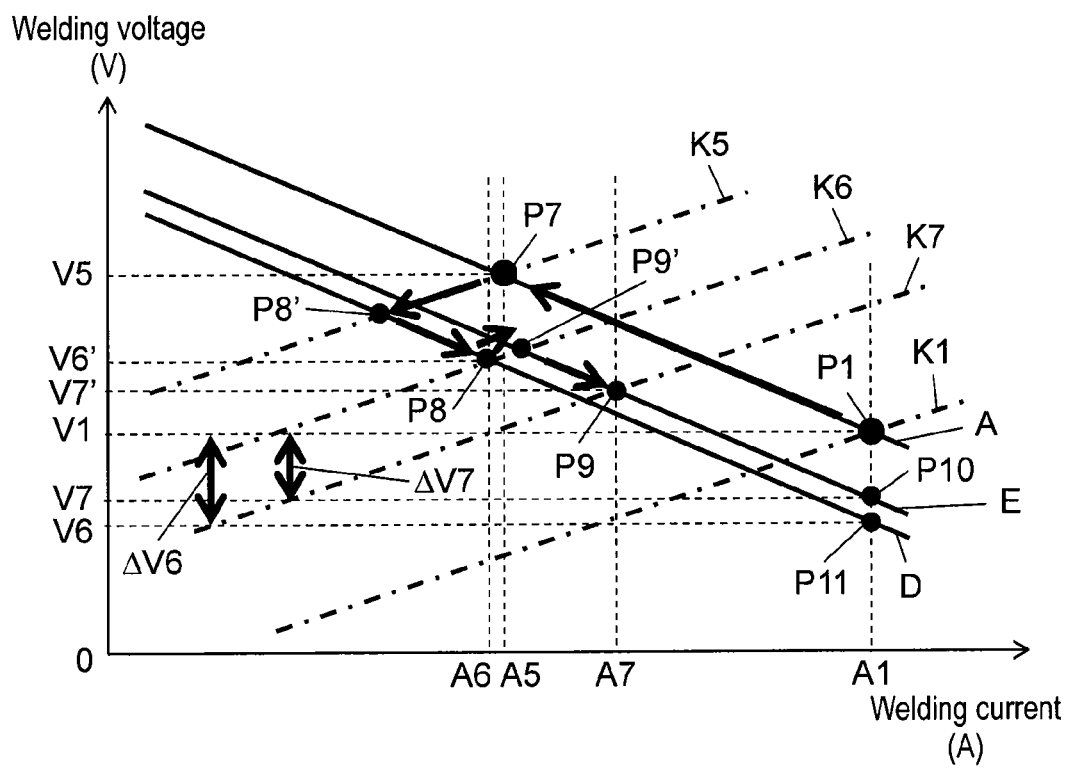
FIG. 3 is a graph showing other output characteristics of a welding current and a welding voltage in accordance with one exemplary embodiment of the present invention.

FIG. 2 is a graph showing output characteristics of a welding current and a welding voltage when welding is carried out by a welding control method in accordance with this exemplary embodiment. FIG. 3 is a graph showing other output characteristics of a welding current and a welding voltage in accordance with this exemplary embodiment. In FIGS. 2 and 3, a set initial welding current is denoted by A1, and a set initial welding voltage is denoted by V1. The set initial welding current and the set initial welding voltage are set in initial condition setting section 8 provided in the welding device by an operator who operates the welding device.

Furthermore, output characteristics A, B and C shown in FIG. 2, as well as output characteristics D and E shown in FIG. 3 show output characteristics of welding device 1. Output characteristic A is a linear output characteristic passing through set initial welding current A1 and set initial welding voltage V1, which is a basic output characteristic. Furthermore, output characteristics B and C, as well as output characteristics D and E show output characteristics of states obtained by shifting basic output characteristic A in parallel as mentioned below. The output characteristics are stored as numerical formulae in storage section 7 provided in the welding device, and shifted in parallel by changing the intercept without changing the gradient by output characteristic setting section 6.

Furthermore, in FIG. 2, arc characteristics K1, K2, K3, and K4 show relations between current and voltage when the arc length is arc lengths L1, L2, L3, and L4, respectively. Arc length L1 is an arc length when the current and voltage are the set initial welding current and the set initial welding voltage set by an operator, respectively, and this is defined as a proper arc length.

Arc length L2 is shorter than arc length L1. Arc length L3 is longer than arc length L2 and shorter than arc length L1. Arc length L4 is longer than arc length L2 and arc length L3 and shorter than arc length L1.

Furthermore, in FIG. 3, arc characteristics K1, K5, K6, and K7 show relations between current and voltage when the arc length is arc lengths L1, L5, L6, and L7, respectively. Similar to FIG. 2, arc length L1 is an arc length when the current and voltage are the set initial welding current and the set initial welding voltage set by an operator, respectively, and this is defined as a proper arc length.

Arc length L5 is longer than arc length L1. Arc length L6 is shorter than arc length L5 and longer than arc length L1. Arc length L7 is shorter than arc length L5 and arc length L6 and longer than arc length L1.

Hereinafter, a welding control method in accordance with this exemplary embodiment is described. Originally, it is basic that welding is carried out in a state in which the arc length is the proper arc length by controlling the welding output so as to be the set initial welding current and the set initial welding voltage, respectively. However, when the arc length does not become the proper length by some influences, by carrying out the below-mentioned control, the arc length is made to be the proper arc length early.

Firstly, the case in which the arc length is shortened from the proper arc length by some influences is described with reference to FIG. 2.

As shown in FIG. 2, when the arc length becomes shorter due to external influences such as motion of the hands (the state is referred to as short arc length L2) from state P1 (the state is referred to as proper arc length L1) in which welding is carried out with the welding output current that is substantially the same value as set initial welding current A1 and the welding output voltage that is substantially the same value as set initial welding voltage V1, the state is shifted from state P1 that is an intersection between output characteristic A and arc characteristic K1 to state P2 that is an intersection between output characteristic A and arc characteristic K2. Thus, the welding output current is increased from A1 to A2, and the welding output voltage is reduced from V1 to V2. In this case, the arc length is changed from proper arc length L1 based on arc characteristic K1 to arc length L2, which is shorter than arc length L1, based on arc characteristic K2. When the state is returned from shorter arc length L2 to proper arc length L1, it takes a long time to recover the arc length by the self-regulation described in the background art. That is to say, recovering of the state takes a long time when the state is shifted on output characteristic A.

Therefore, in the welding control method of this the exemplary embodiment, a set target welding voltage is raised according to a difference between set initial welding voltage V1 and welding output voltage V2 that is lower than set initial welding voltage V1. That is to say, the output characteristics are shifted in parallel. Then, the welding output is controlled to be the set target welding voltage. In this way, by raising a welding output voltage and a welding output current, heat input is actively applied to a welding section including wire 6, so that melting of wire 6 is increased and proper arc length L1 is obtained early. Note here that the set target welding voltage may be a value that is larger than set initial welding voltage V1 by a difference between set initial welding voltage V1 and the welding output voltage. Furthermore, the set target welding voltage may be a value that is larger than set initial welding voltage V1 by an amount that is smaller than the difference between set initial welding voltage V1 and the welding output voltage. Alternatively, the set target welding voltage may be a value that is larger than set initial welding voltage V1 by an amount that is larger than the difference between set initial welding voltage V1 and the welding output voltage.

For example, according to the difference between set initial welding voltage V1 and the welding output voltage, the set target welding voltage is changed to V3 that is higher than set initial welding voltage V1 (V3=V1+ΔV3). According to this change, the output characteristic is changed from output characteristic A to output characteristic B. Thus, the state is shifted from state P2 on output characteristic A to state P3 by way of state P3' on output characteristic B. Therefore, the welding output current is increased from A2 to A3, and the welding output voltage is increased from V2 to V3'. The arc length is increased from L2 to L3 that is longer than L2 for a short time and approaches arc length L1 in proper state P1.

Next, according to the difference between set initial welding voltage V1 and the welding output voltage, the set target welding voltage is changed from V3 to V4 (V4=V1+ΔV4), and the output characteristic is changed from output characteristic B to output characteristic C. Thus, the state is shifted from state P3 on output characteristic B to state P4 by way of state P4' on output characteristic C. Therefore, the welding output current is reduced from A3 to A4, and the welding output voltage is increased from V3' to V4'. The arc length becomes longer from L3 to L4 that is longer than L3 for a short time and further approaches arc length L1 in proper state P1.

In the above-mentioned series of operations, as compared with the case in which the output characteristic is not changed from output characteristic A, when the output characteristic is changed to output characteristic B and further to output characteristic C, the arc length becomes longer from L2 to L3 and further to L4 for a shorter time because heat input is raised by raising the welding output voltage and the welding output current. In this way, by repeating parallel shift of the output characteristic a plurality of times so that the output characteristic approaches output characteristic A, the arc length is allowed to approach proper arc length L1. That is to say, parallel shift from output characteristic C to other characteristics (not shown) is repeated a plurality of times. However, the arc length may be allowed to approach the proper arc length by one parallel shift.

Figure 5:
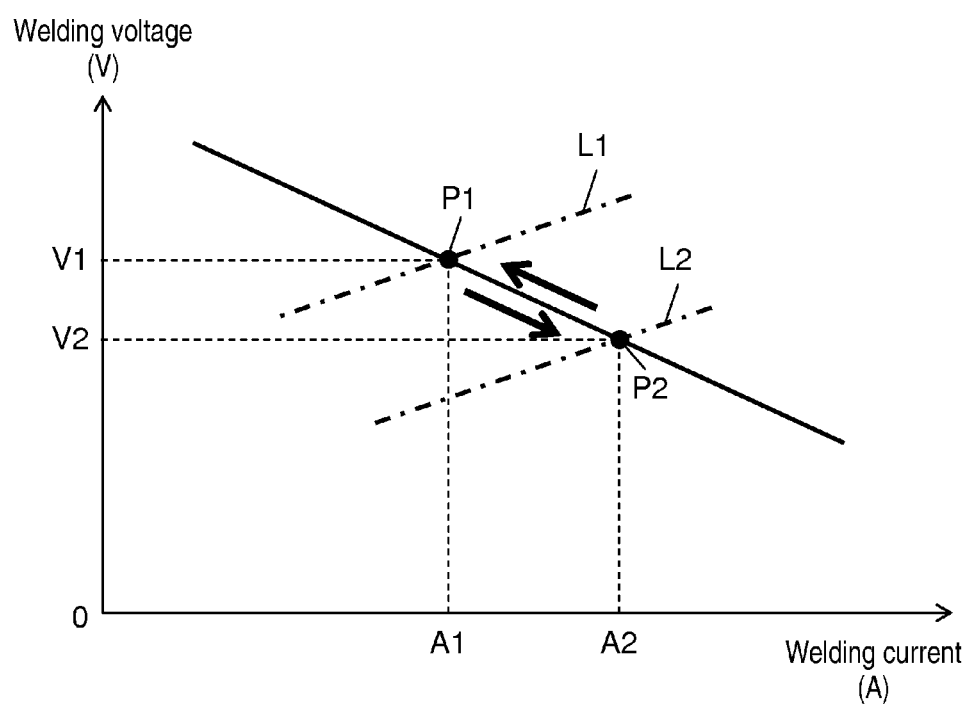
FIG. 5 is a graph showing a conventional output characteristic of a welding current and a welding voltage.

When the output characteristics are changed a plurality of times from output characteristic A to output characteristic B and further to output characteristic C by changing the output characteristic repeatedly in this way, arc length L1 in proper state P1 can be recovered earlier as compared with the case of FIG. 5 in which the output characteristic is not changed from output characteristic A.

Next, a case in which an arc length is longer than the proper length due to some influences is described with reference to FIG. 3.

Control in this case may be carried out in an opposite way to the above. That is to say, as shown in FIG. 3, when the arc length becomes longer due to external influences such as motion of the hands (the state is referred to as long arc length L5) from state P1 (the state is referred to as proper arc length L1) in which welding is carried out with the welding output current that is substantially the same value as set initial welding current A1 and the welding output voltage that is substantially the same value as set initial welding voltage V1, the state is shifted from state P1 that is an intersection between output characteristic A and arc characteristic K1 to state P7 that is an intersection between output characteristic A and arc characteristic K5. Thus, the welding output current is reduced from A1 to A5, and the welding output voltage is increased from V1 to V5. In this case, the arc length is changed from proper arc length L1 based on arc characteristic K1 to arc length L5, which is longer than arc length L1, based on arc characteristic K5. When the state is returned from longer arc length L5 to proper arc length L1, it takes a long time to return the state by the self-regulation described in the background art. That is to say, recovering of the state takes a long time when the state is shifted on output characteristic A.

Therefore, in the welding control method of this exemplary embodiment, a set target welding voltage is lowered according to a difference between set initial welding voltage V1 and welding output voltage V5 that is higher than set initial welding voltage V1. That is to say, the output characteristics are shifted in parallel. Then, the welding output is controlled to be the set target welding voltage. In this way, by lowering a welding output voltage and a welding output current, heat input applied to a welding section including wire 6 is suppressed so as to reduce melting of wire 6. Thus, proper arc length L1 is obtained early.

Note here that the set target welding voltage may be a value that is smaller than set initial welding voltage V1 by a difference between set initial welding voltage V1 and the welding output voltage. Furthermore, the set target welding voltage may be a value that is smaller than set initial welding voltage V1 by an amount that is smaller than the difference between set initial welding voltage V1 and the welding output voltage. Alternatively, the set target welding voltage may be a value that is smaller than set initial welding voltage V1 by an amount that is larger than the difference between set initial welding voltage V1 and the welding output voltage.

For example, a set target welding voltage is changed to V6 that is lower than set initial welding voltage V1 (V6=V1−ΔV6) according to the difference between set initial welding voltage V1 and the welding output voltage, and accordingly, the output characteristic is changed from output characteristic A to output characteristic D. Thus, the state is shifted from state P7 on output characteristic A to state P8 by way of state P8' on output characteristic D. Therefore, the welding output current is reduced from A5 to A6, and the welding output voltage is reduced from V5 to V6'. The arc length is reduced from L5 to L6 that is shorter than L5 for a short time, and approaches arc length L1 in proper state P1.

Next, a set target welding voltage is changed from V6 to V7 according to the difference between set initial welding voltage V1 and the welding output voltage (V7=V1+ΔV7), and the output characteristic is changed from output characteristic D to output characteristic E. Thus, the state is shifted from state P8 on output characteristic D to state P9 by way of state P9' on output characteristic E. Therefore, the welding output current is increased from A6 to A7, and the welding output voltage is reduced from V6' to V7'. The arc length is reduced from L6 to L7 that is shorter than L6 for a short time, and further approaches arc length L1 in proper state P1.

In the above-mentioned series of operations, as compared with the case in which the output characteristic is not changed from output characteristic A, when the output characteristic is changed to output characteristic D and further to output characteristic E, the arc length becomes shorter from L5 to L6 and further to L7 for a short time because the heat input is lowered by lowering the welding output voltage and the welding output current. In this way, by repeating parallel shift of the output characteristic a plurality of times so that the output characteristic approaches output characteristic A, the arc length is allowed to approach proper arc length L1. That is to say, parallel shift from output characteristic E to the other characteristics (not shown) is repeated a plurality of times. However, the arc length may be allowed to approach the proper arc length by one parallel shift.

When the output characteristics are changed a plurality of times from output characteristic A to output characteristic D and further to output characteristic E by changing the output characteristic repeatedly in this way, arc length L1 in proper state P1 can be recovered earlier as compared with the case of FIG. 5 in which the output characteristic is not changed from output characteristic A.

Thus, in the welding control method of this exemplary embodiment, as mentioned above, when the welding output voltage is higher than the set initial welding voltage, the set target welding voltage is changed to be lower, and when the welding output voltage is lower than the set initial welding voltage, the set target welding voltage is changed to be higher.

Next, an example of a case in which an arc length is adjusted in pulse arc welding is described. Also in this case, the welding device has an output characteristic with a predetermined gradient showing the relation between a welding output voltage and a welding output current.

The above-mentioned control is applied to a pulse arc welding, and a set welding voltage may be changed to be higher or lower according to a difference between an output of pulse welding voltage of an immediately preceding pulse with respect to a pulse at a certain time point and an output of welding voltage of a plurality of pulses output before the immediately preceding pulse.

Note here that in pulse arc welding, a plurality of welding pulses are output during welding. When a certain pulse is output, a waveform of the certain pulse is determined during welding, and the welding output is controlled so that the waveform is output.

For example, an average voltage of one immediately preceding pulse of a reference point that is a certain time point during pulse arc welding and an average voltage of preceding ten pulses before the one immediately preceding pulse are compared with each other. When the average voltage of the one immediately preceding pulse is lower, the case is the same as the case in which the state is changed from state P1 to state P2 in FIG. 2. Therefore, as mentioned above, by increasing the set voltage, the state is shifted to state P3. Thus, the arc length is actively increased from the shortened arc length L2 to arc length L3. Furthermore, the parallel shift of output characteristics is repeated as mentioned above, and thereby the arc length may be allowed to recover proper arc length L1 early. Note here that when the average voltage of one immediately preceding pulse is higher, control opposite to the case in which the average voltage of one immediately preceding pulse is lower may be carried out.

Furthermore, in pulse arc welding, control may be carried out in such a way that at least one of a base current and a peak current is changed along with the change of the set welding voltage.

Herein, a method of raising the set welding voltage includes a method of raising a pulse frequency and a method of widening the pulse width. However, in any methods, since the ratio of time in the pulse period is small, it takes a long time for the welding output voltage to change. In particular, when the pulse frequency is changed, the pulse period becomes longer according to the reduction of a current. Therefore, it takes a further long time for the arc length to change.

For example, when the welding output current is 100 A, the pulse period is about 10 msec (pulse frequency is about 100 Hz) and the pulse width is about 2.0 msec. Even if each of them is largely changed, change of the pulse period is ±2 msec and that of the pulse width is about ±0.4 msec, only ±20% change is made. On the other hand, since the period of time in which a base current flows is 8 msec, when the amount of the base current is adjusted, 80% change can be made. When the period of time in which a peak current flows is added, 100% change can be made, thus enabling the welding voltage to be changed largely, which is effective for early adjustment of the arc length.

Figure 4:
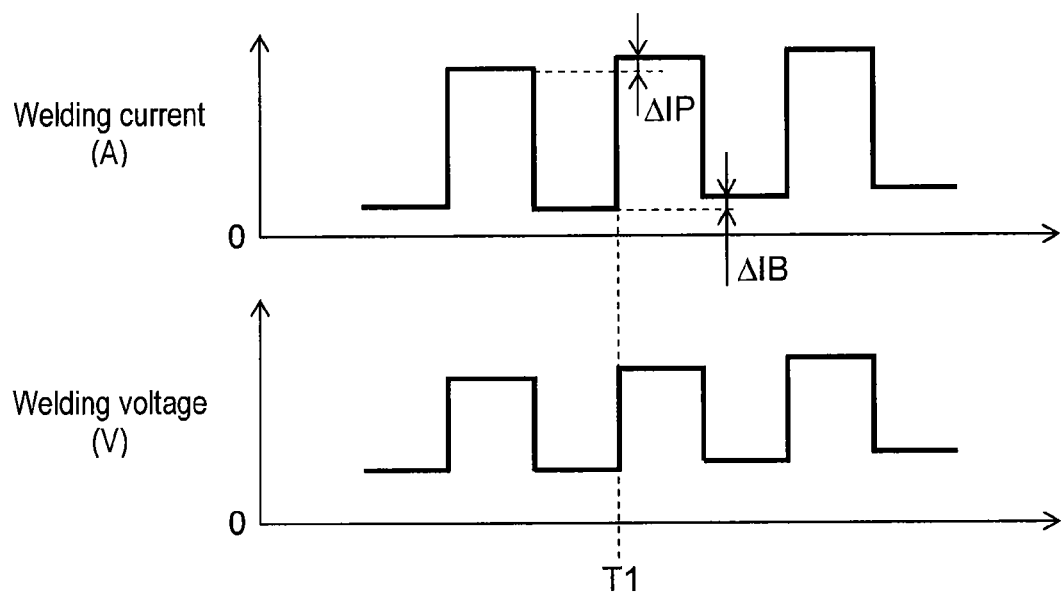
FIG. 4 is a graph showing a welding current waveform in accordance with one exemplary embodiment of the present invention.

In order to obtain the same result by adjusting the pulse frequency or the pulse width, the pulse frequency or the pulse width needs to be changed by larger than ±20%. However, when the pulse frequency or the pulse width is largely changed, the proper state of droplet transfer is disordered. That is to say, spatters of slag, metal particles, or the like, are increased, which may cause an unstable arc. Therefore, it is necessary to early recover the arc length to the original proper state while the droplet transfer is kept stable. Control for achieving this is described with reference to FIG. 4.

For example, when the welding output voltage is low with respect to the set target welding voltage at certain timing T1 and when the set target welding voltage is raised at the next pulse, the next pulse peak current is increased by ΔIP, or next base current is increased by ΔIB, or both the next pulse peak current and the next base current are increased. Thus, since the pulse frequency or the pulse width needs not be largely changed, the droplet transfer is not disordered, so that the welding voltage can be raised and the arc length can be made to be longer. Thus, the increase in spatters can be suppressed, and the proper original arc length can be recovered early.

Next, an example in which the arc length is adjusted based on a current instead of a voltage is described. In the above-mentioned exemplary embodiment, an example in which the set target welding voltage is changed according to the difference between the set initial welding voltage and the welding output voltage is described. However, the set target welding current may be changed to raise a set welding current or to lower a set welding current according to the difference between the set initial welding current and the welding output current.

In this case, as a subject parameter to be controlled according to the change of the welding output voltage mentioned above, the set initial welding voltage is replaced by the set initial welding current. Since the welding voltage and the welding current have 1:1 relation, the replacement can be carried out easily, and the same effect can be obtained as in the case of voltage.

When the welding output current is lower than the set initial welding current, the output characteristic is controlled to be changed so as to raise the set target welding current; and when the welding output current is higher than the set initial welding current, the output characteristic is controlled to be changed so as to lower the set welding current.

As described above, the present invention makes it possible to early stabilize the arc length and achieve stable droplet transfer when the arc length is not constant and is changed because of a gap intervened between workpieces due to occurrence of displacement of workpieces or inaccuracy of workpieces and when the arc length is changed due to external influences such as motion of the hands of a welding operator. That is to say, even if the arc length becomes unstable due to external influences, since the arc length can be recovered to the original proper arc length in a state in which the droplet transfer is stabilized, excellent beads can be obtained. Thus, since occurrence of irregular short-circuit can be suppressed and spatters can be suppressed, the improvement of the productivity and the improvement of the product quality can be achieved.

INDUSTRIAL APPLICABILITY

Since a welding control method of the present invention makes it possible to stabilize the arc length early in a state in which a droplet transfer is stable, it can suppress occurrence of irregular short circuit and suppress spatters. Therefore, since the welding control method of the present invention can achieve the improvement of the productivity and the improvement of the welding quality, it is useful as a welding control method for arc welding.

REFERENCE MARKS IN THE DRAWINGS 1 welding device
2 output control section
3 welding voltage detection section
4 welding current detection section
5 drive instruction section
6 output characteristic setting section
7 storage section
8 initial condition setting section
9 welding wire
10 wire feed device
11 torch
12 base material
13 arc

The invention claimed is:

1. An arc welding control method comprising:
setting a set initial welding voltage;
controlling a welding output voltage to a welding part in an arc welding period to be the set initial welding voltage;
detecting the welding output voltage which is output from the welding part in the arc welding period; and
controlling the welding output voltage to the welding part in the arc welding period to be a first set target welding voltage, wherein
the first set target welding voltage is higher than the set initial welding voltage when the welding output voltage is lower than the set initial welding voltage, and
the first set target welding voltage is lower than the set initial welding voltage when the welding output voltage is higher than the set initial welding voltage.

2. The arc welding control method of claim 1,
wherein a first difference between the set initial welding voltage and the first set target welding voltage depends on a second difference between the welding output voltage and the set initial welding voltage.

3. The arc welding control method of claim 2, further comprising:
changing the first set target welding voltage to a second set target welding voltage to output to the welding part in the arc welding period, wherein
the second set target welding voltage is between the set initial welding voltage and the first set target welding voltage.

4. The arc welding control method of claim 1,
wherein the first difference is smaller than the second difference.

5. The arc welding control method of claim 4, further comprising:
changing the first set target welding voltage to a second set target welding voltage to output to the welding part in the arc welding period, wherein
the second set target welding voltage is between the set initial welding voltage and the first set target welding voltage.

6. The arc welding control method of claim 1, further comprising:
changing the first set target welding voltage to a second set target welding voltage to output to the welding part in the arc welding period, wherein
the second set target welding voltage is between the set initial welding voltage and the first set target welding voltage.

7. A pulse arc welding control method comprising:
setting a set initial welding voltage;
controlling a welding output voltage to a welding part in a pulse arc welding period to be the set initial welding voltage;
detecting the welding output voltage which is output from the welding part in the pulse arc welding period; and
controlling the welding output voltage to the welding part in the pulse arc welding period to be a first set target welding voltage, wherein
the first set target welding voltage is higher than the set initial welding voltage when the welding output voltage of a pulse in the pulse arc welding period is lower than a plurality of the welding output voltages output before the pulse, and
the first set target welding voltage is lower than the set initial welding voltage when the welding output voltage of the pulse is higher than the plurality of the welding output voltages output before the pulse.

8. The pulse arc welding control method of claim 7,
wherein a first difference between an average of the set initial welding voltage and an average of the first set target welding voltage depends on a second difference between an average of the welding output voltage of the pulse and an average of the plurality of the welding output voltages output before the pulse.

9. The pulse arc welding control method of claim 7,
wherein the first difference is smaller than the second difference.

10. The pulse arc welding control method of claim 7 further comprising:
changing at least one of a pulse welding base current and a pulse welding peak current.

11. The pulse arc welding control method of claim 10,
wherein when the welding output voltage is lower than the first set target welding voltage, at least one of a pulse welding peak current and a pulse welding base current is increased.

12. The pulse arc welding control method of claim 7, further comprising:
changing the first set target welding voltage to a second set target welding voltage to output to the welding part in the pulse arc welding period, wherein
the second set target welding voltage is between the set initial welding voltage and the first set target welding voltage.

13. An arc welding control method comprising:
setting a set initial welding current,
controlling a welding output current to a welding part in an arc welding period to be set initial welding current;

detecting the welding output current which is output from the welding part in the arc welding period; and controlling the welding output current to the welding part in the arc welding period to be a first set target welding current, wherein the first set target welding current is higher than the set initial welding current when the welding output current is lower than the set initial welding current, and the first set target welding current is lower than the set initial welding current when the welding output current is higher than the set initial welding current.

14. The arc welding control method of claim 13, wherein a first difference between the set initial welding current and the first set target welding current depends on a second difference between the welding output current and the set initial welding current.

15. The arc welding control method of claim 14, further comprising:

changing the first set target welding current to a second set target welding current to output to the welding part in the arc welding period, wherein the second set target welding current is between the set initial welding current and the first set target welding current.

16. The arc welding control method of claim 13, wherein the first difference is smaller than the second difference.

17. The arc welding control method of claim 16, further comprising:

changing the first set target welding current to a second set target welding current to output to the welding part in the arc welding period, wherein the second set target welding current is between the set initial welding current and the first set target welding current.

18. The arc welding control method of claim 13, further comprising:

changing the first set target welding current to a second set target welding current to output to the welding part in the arc welding period, wherein the second set target welding current is between the set initial welding current and the first set target welding current.

* * * * *